Figure 1:
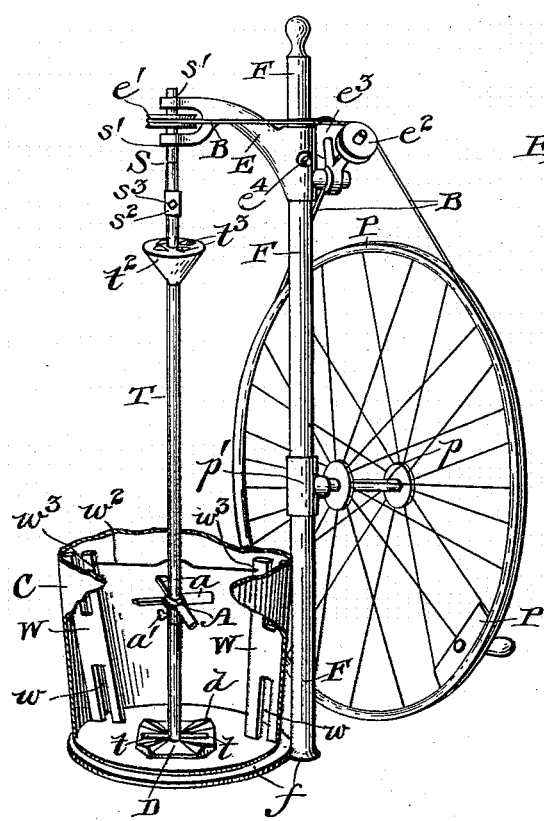

(No Model.)

N. J. TUBBS.
CHURN.

No. 601,387. Patented Mar. 29, 1898.

WITNESSES
Severance
H. Muachney

INVENTOR
Nelson J. Tubbs

THE NORRIS PETERS CO., PHOTO-LITHO., WASHINGTON, D. C.

UNITED STATES PATENT OFFICE.

NELSON J. TUBBS, OF KNOXVILLE, TENNESSEE.

CHURN.

SPECIFICATION forming part of Letters Patent No. 601,387, dated March 29, 1898.

Application filed April 14, 1896. Serial No. 587,500. (No model.)

*To all whom it may concern:*

Be it known that I, NELSON J. TUBBS, a citizen of the United States, residing at Knoxville, in the county of Knox and State of Tennessee, have invented certain new and useful Improvements in Churns; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention has for its object the provision of an improved mechanism whereby in butter-making the butter globules are thoroughly separated from the other constituents of milk or cream without disintegrating the butter globules or uniting with them casein, milk, or other refuse substances, and this at a saving of time, labor, and material.

The device consists of the following instrumentalities: First, a rotary dasher of wood or metal, upon the face of which are angular projections or hips, the apices of which converge to the center of the dasher, which is pivoted in the bottom of the churn or butter-separator; second, a tubular connecting-shaft engaging with said rotary dasher, slots or perforations in said tubular shaft, an air-drum attached to said shaft and surrounding said slots or perforations, hooded apertures in the top of said air-drum, and aerating-tubes leading from the interior of said tubular shaft, and near its base, to, or near to, the rim of the dasher, the tubular shaft being connected by an adjustable sleeve with a pulley-shaft journaled in the pulley-arm of an upright frame; third, an auxiliary dasher or agitator composed of obliquely-set paddles, of wood or metal, united by a ring inclosing said tubular shaft, adjustable, by means of a set-screw, to any desired height; fourth, slotted wings, removable at will, provided with brads on the bottom and outer edges and braced by a connecting-spring engaging notches on the inner sides of said wings, which are attached to the sides of the churn or butter-separator preferably in an oblique position, the whole being so arranged that said dasher, auxiliary dasher or agitator, tubular shaft and air-drum, and the aerating-tubes before referred to will be rotated by the power transmitted by a pulley or a series of pulleys from a band or power wheel operated by hand or otherwise, whereby a centrifugal wave or wall is created, which is broken and diverted in a centripetal direction by the slotted wings only to be again repelled by the centrifugal action of the rotating dasher into the undercurrent and overcurrent which has passed unobstructed through the slots in said wings, so that a more complete agitation of the contents of the churn or separator results, while the rotation of the air-drum causes a thorough aeration of the milk or cream, the air being better collected by the drum and better distributed into the fluid through the aerating-tubes than in any other device of a similar character.

Figure 2:
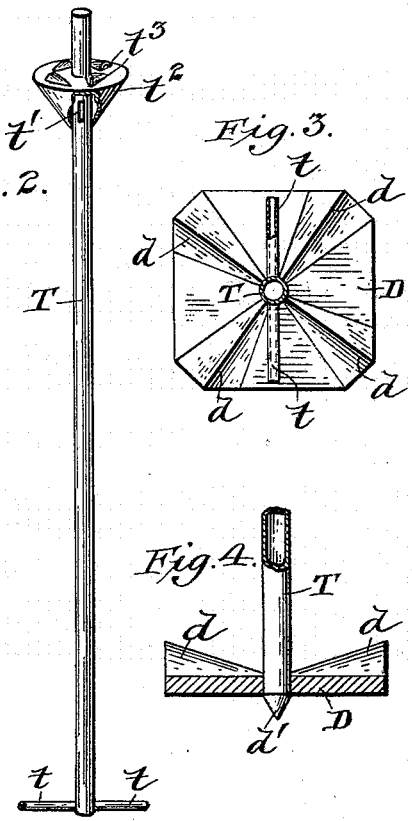
Figure 3:
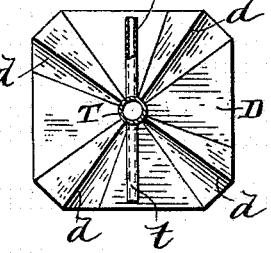
Figure 4:
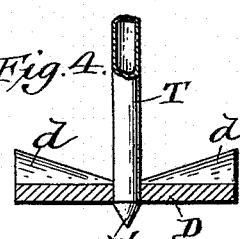
Figure 5:
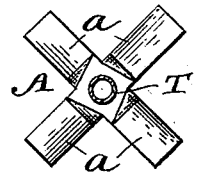
Figure 6:
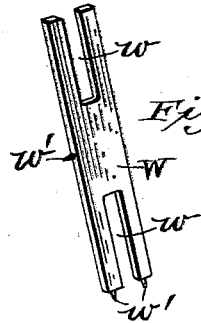

In the accompanying drawings, forming a part of this specification, Figure 1 represents a side elevation of the device embodying my invention, the sides of the churn or butter-separator being broken away the better to exhibit the construction and mode of operation of my improved mechanism. Fig. 2 represents the aerating device, a material feature of my invention, the sides of the air-drum being broken away to show the aerating slots or perforations in the tubular connecting-shaft. Fig. 3 represents a top view of the rotary dasher. Fig. 4 represents a transverse section of said dasher. Fig. 5 represents a top view of agitator or auxiliary dasher. Fig. 6 represents a front view of the slotted wings.

In the drawings similar letters refer to similar parts of the device.

In the drawings, F is a post or beam adjusted to the base $f$ and provided with the pulley-arm E. S is a pulley-shaft journaled to said pulley-arm at $s'$, provided with horizontally-rotating pulley $e'$ and with the adjustable sleeve $s^2$, which is provided, preferably, with the set-screw $s^3$. The pulley-arm E is also provided with the pulleys $e^2$ and $e^3$, operating at right angles to each other and with the set-screw $e^4$.

P is a band or power wheel (preferably of the bicycle type when hand-power is used) provided with the axle $p$, in the form of a screw-bolt, engaging, through the sleeve $p'$, with the post or beam F. The band or power wheel P is also provided with the band or belt B, which is geared to the pulleys $e^2$, $e'$, and $e^3$, so that the revolution of the band or power wheel P rotates the pulley-shaft S.

The tubular connecting-shaft T is closed at the top and at its base and is connected with the pulley-shaft S by means of the adjustable sleeve $s^2$, which is provided with the set-screw $s^3$. The tubular connecting-shaft T is provided in its upper third with the slots or perforations $t'$, about which is fitted the air-drum $t^2$, in the roof of which are the hooded apertures $t^3$, and with the aerating-tubes $t$. To the base of the tubular connecting-shaft T is attached the rotary dasher D, which is provided with the triangular projections or hips $d$ and with pivot $d'$.

The adjustable agitator or auxiliary dasher A is provided with the paddles $a$ and with the set-screw $a'$, so that it may be adjusted to any desired height. The wings W are provided with the slots $w$ and with the brads $w'$ in the sides and bottoms thereof, being braced when in position by the engagement of the spring $w^2$ in the grooves or notches $w^3$ in the inner edges of said wings.

C is a churn or butter-separator provided with a suitable cover, fitting about the tubular connecting-shaft T, and with a pivot journal or socket of the usual form.

The operation of the device is as follows: The mechanism being assembled and in the position shown in Fig. 1, the churn or separator containing milk or cream, the revolution of the band or power wheel P transmits a rotary movement to the pulley-shaft S by means of the band B operating on the pulleys $e^2$, $e'$, and $e^3$, thereby rotating the tubular shaft T, the air-drum $t'$, the aerating-tubes $t$, the dasher D, and the agitator or auxiliary dasher A on the pivot $d'$. The centrifugal wave or wall created by the rotation of the dasher D and the agitator or auxiliary dasher A being broken and diverted in part in a centripetal manner by the wings W, the under and over currents created by the portions of the wave or wall which pass through the slots $w$ being broken or chopped by the diverted portion of said wave or wall, which, after having been thrown toward the center by the wings W, is strongly repelled by the centrifugal action before referred to into the currents that have passed uninterruptedly through the slots $w$, whereby a complete agitation of the fluids results, while the air fanned down the tubular shaft T by the air-drum $t^2$ through the slots or perforations $t'$ is discharged, not in the trough created by the centrifugal action of the dasher D, as in other devices having a similar purpose, but directly into and under the centrifugal wave or wall before referred to by means of the aerating tubes $t$, so that all the air fanned down the tubular connecting-shaft T is forced violently into said centrifugal wave or wall, whereby a complete aeration of the fluid ensues, the air-current before referred to also coöperating to secure a complete agitation of the milk or cream, because expelled into it with a force proportionate to the rapidity of the revolutions of the connecting-shaft T, as is apparent. It will be further observed that the tubular connecting-shaft T is adjustable to churns or separators of different heights by means of the connecting-sleeve $s'$ and the set-screw $s^3$, and that it may be readily disconnected and removed, as is apparent. The agitator or auxiliary dasher A and the pulley-arm E, being provided with the set-screws $a'$ and $e^4$, are adjustable to any height on or susceptible of being removed from the tubular connecting-shaft T and the post or beam F, respectively, the band or power wheel P being provided with the sleeve $p'$ and the axle $p$, the latter in the form of a screw-bolt, the whole being so adapted as to be adjustable to any height on or susceptible of being removed from the post or beam F, as is apparent. The wings W are likewise adjustable or removable at will, as the brace-spring $w^2$ is capable of being readily adjusted to or removed from the grooves or notches $w^3$, while the brads $w'$ can be readily inserted in and withdrawn from the sides and bottom of the churn or separator.

To give stability to the device the post or beam F should be firmly attached to the base, which may be provided with clamps or other suitable means to hold the churn or separator in position.

Having described my invention and its operation, what I claim is—

1. A churn-dasher comprising a single vertical tubular shaft T having lateral inlet-openings $t'$ at its upper end and lateral discharge-outlets near its lower end, an inverted conical air-drum $t^2$ on the upper portion of the shaft and communicating at its apex with the inlet-openings; the top of the drum having hooded air-inlets $t^3$, and a dasher proper on the lower end of the shaft and formed of a single horizontal plate or casting D formed with integral radial ʌ-shape ribs or wings decreasing in diameter toward the shaft; substantially as described.

2. In a churn the wing or breaker W provided with longitudinal slots $w$ $w$ and having penetrating points or brads $w'$ $w'$ at its lower end and at one longitudinal edge and means for bracing the breaker from the opposite side of the churn-body, substantially as described.

3. In a churn, a pair of wings or breakers W having penetrating points $w'$ $w'$ at their lower ends and opposite longitudinal edges and in the upper ends of their adjacent edges provided with recesses $w^3$, in combination with a separate and independent horizontally-extending brace $w^2$ the ends of which engage the recesses $w^3$, substantially as described.

In testimony whereof I affix my signature in presence of two witnesses.

NELSON J. TUBBS.

Witnesses:
JNO. A. CONDON,
A. C. MACNULTY.